United States Patent
Wakamatsu et al.

[15] 3,652,901
[45] Mar. 28, 1972

[54] DEVICE FOR PREVENTING SIMULTANEOUS ENERGIZATION OF ELECTROMAGNETIC COILS IN AN AUTOMATIC SPEED CHANGE CONTROL SYSTEM FOR AUTOMOBILES

[72] Inventors: Hisato Wakamatsu, Kariya; Akira Kitano, Nagoya; Hisasi Kawai, Toyohashi, all of Japan

[73] Assignee: Nippondenso Kabushiki Kaisha, Kariya-shi, Japan

[22] Filed: Mar. 16, 1970

[21] Appl. No.: 19,780

[30] Foreign Application Priority Data

Apr. 28, 1969 Japan..................................44/32999

[52] U.S. Cl. ..........................317/136, 317/148.5 R, 74/365
[51] Int. Cl. ..................................H01h 47/00, F16h 57/06
[58] Field of Search..........................74/365; 317/136, 137

[56] References Cited

UNITED STATES PATENTS

| 2,787,740 | 4/1957 | Helmert | 317/136 |
| 3,122,940 | 3/1964 | Shimwell et al. | 74/365 X |
| 3,267,762 | 8/1966 | Reval | 74/365 |
| 3,296,499 | 1/1967 | Quinlan | 317/137 |
| 3,466,505 | 9/1969 | Anderson | 317/136 |

Primary Examiner—Carlton R. Croyle
Assistant Examiner—Thomas C. Perry
Attorney—Cushman, Darby & Cushman

[57] ABSTRACT

A device for preventing the simultaneous energization of electromagnetic coils used for driving the speed change gears in the automatic speed control system for an automobile, which device comprises resistors having one end thereof connected with the positive terminal of electromagnetic coils of electromagnetic valves, the other ends of the resistors being connected in common with the magnetic pole of a constant-voltage diode, and a power control circuit provided between a battery and a load, the positive pole of the constant-voltage diode being connected with the control signal input terminal of the power control circuit, whereby when two or more of the electromagnetic coils are about to be energized simultaneously, a current is passed through the constant-voltage diode to the control signal input terminal of the power control circuit to thereby cut off a current in the power control circuit and therefore the current to electromagnetic coils. The device is simple in circuit arrangement and free of the malfunction resulting from the qualitative irregularity of electrical components in use, or from variations in the ambient temperature or the source voltage.

4 Claims, 4 Drawing Figures

DEVICE FOR PREVENTING SIMULTANEOUS ENERGIZATION OF ELECTROMAGNETIC COILS IN AN AUTOMATIC SPEED CHANGE CONTROL SYSTEM FOR AUTOMOBILES

This invention relates to an automatic speed change control system for a vehicle such as a motor bus, and more particularly it relates to an improved device for preventing two or more electromagnetic coils for the gear change in such a system from being simultaneously energized.

According to the prior art, a preventive device of the type as shown in FIG. 1 has been used in a bus or like vehicle. Such a known preventive device uses a battery 1 having a terminal voltage of 24 volts and mounted on the vehicle, a protective circuit 2, and a resistor 3 having one end thereof connected with the positive pole of the battery 1 and the other end connected with the emitter of a PNP-type power transistor 4. A diode 5 has the positive pole thereof connected with the base of the transistor 4, and the negative pole of the diode 5 is connected with one end of a resistor 6, the other end of which is connected in series with one end of a resistor 7. The other end of the resistor 7 is grounded. A diode 8 has the negative pole thereof connected with the collector of the transistor 4 and the positive pole of the diode 8 is grounded. A transistor 9 has the emitter and base thereof connected with the positive pole of the battery 1 and the emitter of the transistor 4, respectively. The collector of the transistor 9 is grounded through a resistor 10. A resistor 11 is connected between the emitter and collector of the transistor 9. A resistor 12 has one end thereof connected with the collector of the transistor 9 and the other end connected with the gate terminal 13a of SCR 13, whose positive and negative poles are connected with the positive pole of the battery 1 and the connection point between the resistors 6 and 7, respectively. A surge voltage absorbing capacitor 14 is connected between the gate terminal 13a and negative pole of SCR 13. A selector switch 20 is provided which has a movable contact 21, and fixed contacts 22, 23, 24, 25 and 26 directed to use for backing, first speed, second speed, third speed and automatic speed change respectively. There is provided an electromagnetic valve driving circuit 30 comprising a relay and a diode, and this circuit is operative when a signal is applied to the input terminal 31 thereof. The circuit 30 is arranged so that command signals for the first to fourth speeds are applied to input terminals 32, 33, 34 and 35 respectively, and output terminals 36, 37, 38 and 39 are connected with the electromagnetic coils 42, 43, 44 and 45 of an electromagnetic valve unit 40. The electromagnetic valve unit 40 comprises the electromagnetic coils 42 to 45 and another electromagnetic coil 41, as well as five electromagnetic valves (shown as values 41′, 42′, 43′, 44′ and 45′) respectively, corresponding to the five electromagnetic coils 41, 42, 43, 44 and 45. The electromagnetic coils 41 to 45 are directed to use for backing, first speed, second speed, third speed and fourth speed. If one of these electromagnetic coils, for example, the one indicated by 42 is electrically energized, an electromagnetic valve corresponding to that coil is opened to allow compressed air to pass therethrough to thereby close a predetermined clutch, whereby a predetermined speed change gear in the multi-gear speed changer is coupled to a gear for the engine through a fluid coupling. However, if the electromagnetic valve driving circuit 30 malfunctions or is damaged, for example, and thereby two or more of the five electromagnetic coils 41 to 45 in the electromagnetic valve unit 40 are simultaneously energized, two or more of the change gears in the multi-gear speed changer might be operated to damage themselves. According to the prior art, such possible damage to the change gears resulting from the aforementioned simultaneous energization of two or more electromagnetic coils has been prevented by stopping the operation of the change gears, and for this purpose there is provided the protective circuit 2 as mentioned previously.

Description will now be made of this protective circuit 2 with respect to the operation thereof. Assume that the electromagnetic coil 42 in the electromagnetic valve unit 40 is energized by the output of the electromagnetic valve driving circuit 30. Then the base current of the transistor 4 flows from the battery 1 through the resistor 3, the emitter-base of the transistor 4, diode 5 and resistors 6 and 7. As a result, the collector current of the transistor 4 (approximately 0.4 A for 24 V. source voltage) flows into the electromagnetic coil 42 in the electromagnetic valve unit 40 through the movable contact 21 and fixed contact 23 of the selector switch 20. At this point the voltage across the resistor 3 is approximately 0.4 volt, and the operating voltage $V_{BE}$ of the base-emitter of the transistor 9 is approximately 0.6 volt. Therefore, the transistor 9 is nonconductive and accordingly the gate terminal 13a of SCR 13 assumes a negative potential with respect to the negative pole, so that SCR 13 is rendered nonconductive. Thereupon, if any trouble occurs in the selector switch 20 or in the electromagnetic valve driving circuit 30 to cause a current to flow into the already energized electromagnetic coil 42 in the electromagnetic valve unit 40, as well as into another electromagnetic coil such as coil 43, then the voltage across the resistor 3 becomes approximately 0.8 volt, whereby a collector current corresponding to this voltage flows to the transistor 9. Thus, the potential at the gate terminal 13a of SCR 13 becomes higher than the potential at the negative pole thereof to render the SCR momentarily conductive and turn off the transistor 4, thereby cutting off the current supply to the electromagnetic coils 42 and 43.

In the known protective device 2, as described above, the current flowing to one electromagnetic coil or the current flowing to two electromagnetic coils are monitored as a voltage appearing across the resistor 3 and this voltage is detected by the transistor 9 to thereby energized SCR 13 so as to cut off the current to two or more electromagnetic coils. Such a device, however, requires a complicated arrangement as shown in FIG. 1. Moreover, the detection carried out by this known device is very subtle in that when a current flows to two electromagnetic coils simultaneously, the difference between approximately 0.4 volt and approximately 0.8 volt must be detected by the base-emitter operating voltage $V_{BE}$ of the transistor 9 which is approximately 0.6 volt. For example, a variation in the source voltage or in the ambient temperature would cause a variation in the aforementioned base-emitter voltage $V_{BE}$ of the transistor 9, and this would result in a malfunctioning of the device. In addition, the resistor 3, transistor 9 and other parts in use must be selected very strictly with respect to their performance and the assemblage of these parts requires a greater number of procedures. Also, the provision of the resistor 3 leads to a wasteful consumption of power.

It is an object of the present invention to provide a device for preventing the simultaneous energization of electromagnetic coils in an automatic speed change control system for an automobile, which device comprises a plurality of electromagnetic valves for driving the speed change gears of the automatic speed change control system, and a plurality of resistors having one end thereof connected with the positive terminal of the electromagnetic coils of the electromagnetic valves, the other ends of the resistors being connected in common with the negative pole of a constant-voltage diode, the positive pole of the constant-voltage diode being connected with a power control circuit for supplying power to the electromagnetic coils of the said electromagnetic valves.

According to the present invention, if for some reason or other, power is supplied to the electromagnetic coils of two or more electromagnetic valves at a time, such current is passed to the constant-voltage diode to cut off the power control circuit and thereby cut off the current to all the electromagnetic coils so as to stop the speed change gears and prevent the gears from being damaged.

Further, according to the present invention, the device has a higher reliability in operation than the known device of this type and is free from any malfunctions which may arise from the qualitative irregularity of the electrical components in use or from variations in the ambient temperature or the source voltage. Also, the power control circuit of the present invention may also serve as the power source circuit of the automatic speed change control system, whereby the device of the present invention will only require a constant-voltage diode and a plurality of resistors. This leads to a very much simplified circuit arrangement and a lower cost of manufacture.

Other objects and features of the present invention will become fully apparent from the following description taken in conjunction with the accompanying drawings, in which.

Figure 2:
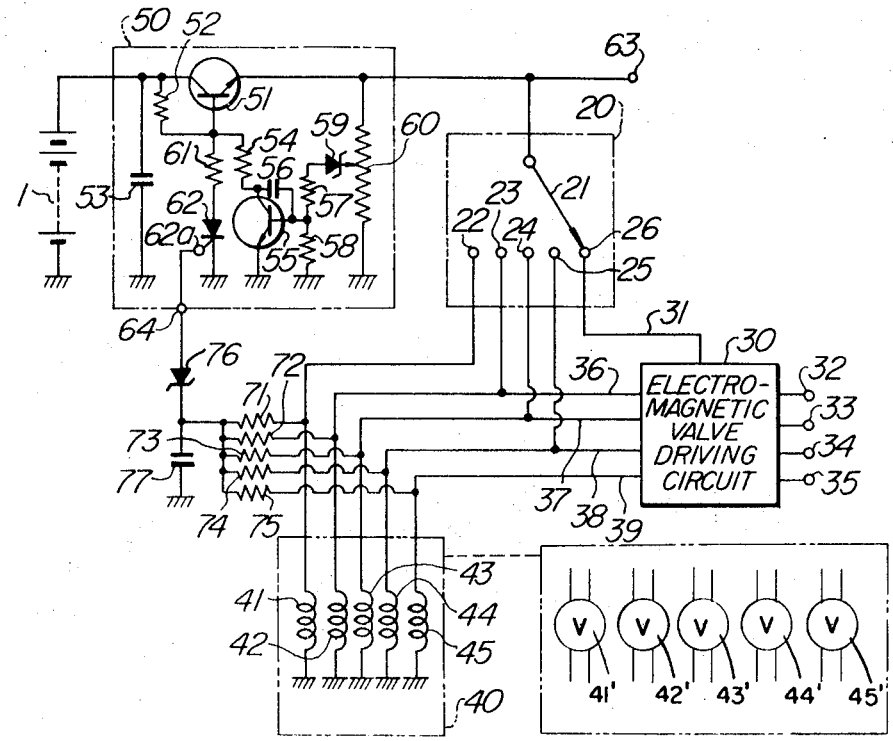
FIG. 2 is an electric circuit diagram showing the device of the described type according to an embodiment of the present invention.

Referring to FIG. 2, there is shown a battery 1 mounted in a vehicle such as a bus or the like. A constant-voltage power control circuit 50 of the well-known type is constituted by elements 51 to 60. A resistor 61 has one end thereof connected with the base of the transistor 51 and the other end connected with the positive pole of SCR 62, whose negative pole is grounded. SCR 62 has a gate terminal 62a. Numerals 63 and 64 denote the output and input terminals of the constant-voltage power control circuit 50, respectively. A selector switch 20 is provided whose movable contact 21 is connected with the output terminal 63 of the constant-voltage power control circuit 50. The selector switch 20 also has fixed contacts 22, 23, 24, 25 and 26 directed to use for backing speed, first speed, second speed, third speed and automatic speed change, respectively. Numeral 30 denotes an electromagnetic valve driving circuit having an input terminal 31 connected with the power line disposed in the electromagnetic valve driving circuit. Numerals 32, 33, 34 and 35 indicate input terminals for applying command signals for the first, second, third and fourth speeds respectively, and numerals 36, 37, 38 and 39 indicate output terminals connected with the positive terminal of the electromagnetic coils 42, 43, 44 and 45 of an electromagnetic valve unit 40 which are directed to the first, second, third and fourth speeds respectively. The fixed contact 22 of the selector switch 20 is connected with the electromagnetic coil for the backing speed, while the other fixed contacts 23, 24 and 25 are connected with the positive terminal of the electromagnetic coils 42, 43 and 44 respectively. The other end of each electromagnetic coil 41, 42, 43, 44, 45 is grounded and its DC impedance is approximately 50 Ω. There are provided resistors 71, 72, 73, 74 and 75 having an equal resistance value, and these resistors have one end thereof connected with the positive terminal of the electromagnetic coils 41, 42, 43, 44 and 45 respectively, and the other ends thereof connected in common with the negative pole of a constant-voltage diode 76 whose breakdown voltage is 7 volts. The positive pole of the constant-voltage diode 76 is connected with the control signal input terminal 64 of the constant-voltage power control circuit 50. There is also provided a surge voltage absorbing capacitor 77 having one end thereof connected with the negative pole of the constant-voltage diode 76 and the other end grounded.

Figure 1:
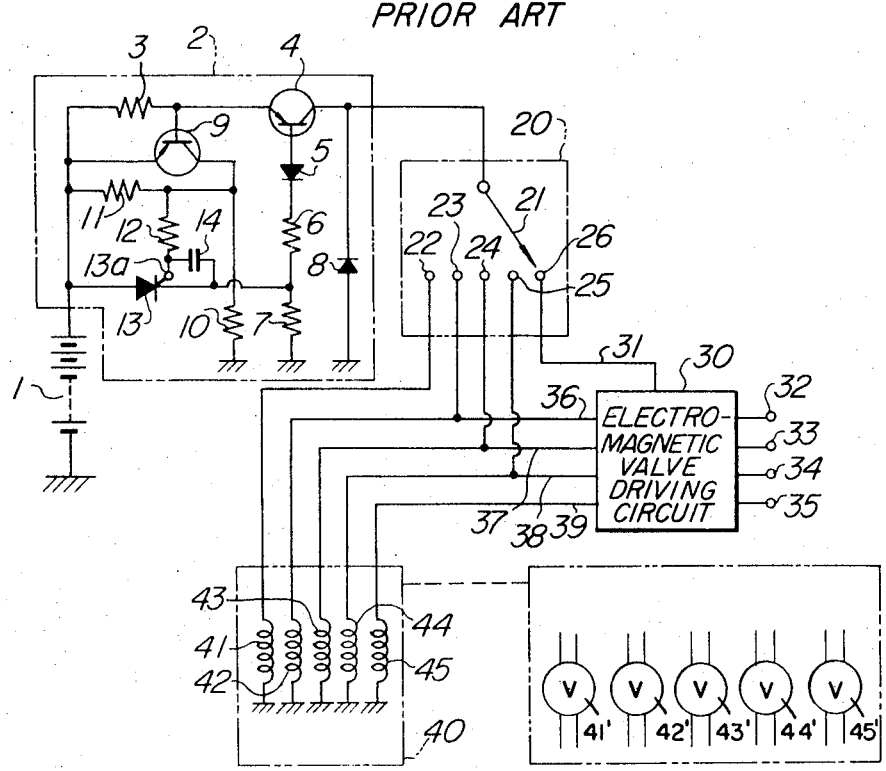
FIG. 1 is an electric circuit diagram showing the conventional device for preventing the simultaneous energization of the electromagnetic coils in the automatic speed change control system for an automobile.
Figure 3:
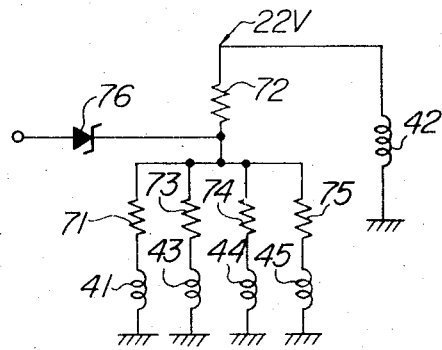
FIG. 3 is an electric circuit diagram showing the equivalent circuit when a current is supplied to the electromagnetic coil of one of the electromagnetic valves in the device of FIG. 2.
Figure 4:
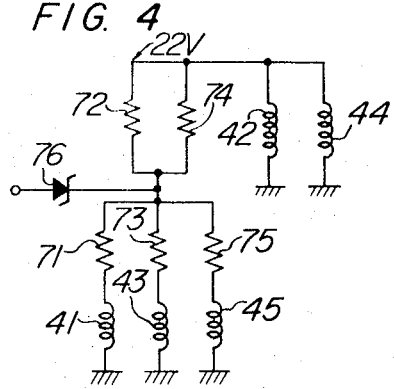
FIG. 4 is an electric circuit diagram showing the equivalent circuit when a current is supplied to the electromagnetic coils of two of the electromagnetic valves simultaneously.

Description will now be made of the operation of the above-described device according to the present invention. When no voltage is applied to the control signal input terminal 64 of the constant-voltage power control circuit 50, there is no gate signal applied to the gate terminal 62a of SCR 62. Thus SCR 62 is in the "OFF" state and the constant-voltage power control circuit 50 is then producing an output voltage at the output terminal thereof. It is assumed that the output voltage at the output terminal 63 is 22 volts and that the movable contact 21 of the selector switch 20 is engaged with the fixed contact 26 to bring about the automatic speed change position. If a command signal (voltage) is applied to the input terminal 32 of the electromagnetic valve driving circuit 30 which is directed to the first speed, then the electromagnetic coil 42 in the electromagnetic valve unit 40 directed to the first speed is energized while the other electromagnetic coils 41, 43, 44 and 45 remain unenergized. Thereupon, a voltage of approximately 22 volts appears at the positive terminal of the electromagnetic coil 42, while a voltage of approximately 0 volt appears at the positive terminal of each of the other electromagnetic coils 41, 43, 44 and 45. Thus, if the voltage at the negative pole of the constant-voltage diode 76 is calculated in accordance with FIG. 3 showing the equivalent circuit provided by the electromagnetic valve unit 40 and resistors 71 to 75 when only the electromagnetic coil 42 is energized, the result will be 22v. × 1/5 = 4.4v., where the DC impedance of the electromagnetic coils 41 to 45 is neglected because it is very small as compared with the resistance value of the resistors 71 to 75 (several k.Ω). Nevertheless, the constant-voltage diode 76 is nonconductive in the backward direction because its breakdown voltage is 7 volts. Under these conditions, if the selector switch 20 or the electromagnetic valve driving circuit 30 experiences trouble or the lead wire is short-circuited to cause a voltage of 22 volts to be applied to the electromagnetic coil 44 for the third speed, then the equivalent circuit provided by the electromagnetic valve unit 40 and resistors 71 to 75 will be brought into the state as shown in FIG. 4, whereby the voltage appearing at the negative pole of the constant-voltage diode 76 becomes 22 × 2/5 = 8.8v. Nevertheless, the constant-voltage diode 76 is turned on in the backward direction because its breakdown voltage is 7 volts. Thus, a voltage is applied through the constant-voltage diode 76 to the gate terminal 62a of SCR 62 in the constant-voltage power control circuit 50 to thereby turn on SCR 62. When SCR 62 is thus turned on, the voltage at the base of the transistor 51 becomes approximately 0 volt and thereby the transistor 51 is turned off to cut off the current to the output terminal 63 and accordingly to the electromagnetic coils 42 and 44. This state may be returned to the original state by disconnecting the lead wire from the battery 1 and re-connecting them together to turn off SCR 62.

While description has been made of the operation of the present invention only with respect to the case where the electromagnetic coils 42 and 44 are simultaneously energized, it will be apparent that when two or more of the five electromagnetic coils 41 to 45 are simultaneously energized the constant-voltage power control circuit 50 is disconnected to cut off the current supply to all of the five electromagnetic coils 41 to 45. The capacitor 77 is employed to absorb a surge voltage.

In the illustrated example, the constant voltage power control circuit 50 may be replaced by a simple power control circuit to accomplish an identical operation with that achieved by using such a power control circuit as shown by 50. Further, it is of course possible to utilize the existing power control circuit in the automatic-speed change control system as the power control circuit for the device of the present invention, without the need to provide a power control circuit directed to the specific purpose of the present invention.

We claim:

1. A device for preventing the simultaneous energization of a plurality of electromagnetic valves in an automatic speed change control system of an automobile, wherein electromagnetic coils of the electromagnetic valves are each respectively connectable to a power source through a power control circuit means, each of the electromagnetic coils being operable when energized to actuate a respectively corresponding electromagnetic valve in the automatic speed change control system, said device comprising:

a plurality of resistors, each being connected at one end to a first terminal of a respectively corresponding one of said electromagnetic coils, and a constant-voltage diode having one pole thereof connected to a control terminal of the power control circuit means and having the other pole thereof connected in common to all the other ends of said plurality of resistors whereby the voltages supplied to said electromagnetic coils are effectively summed to cause conduction of said diode whenever more than one electromagnetic coil is energized whereby the power control circuit means control terminal is energized to thereafter cause cessation of power supply to the electromagnetic coils whenever more than one is simultaneously energized.

2. A device as in claim 1 wherein the said one pole of said constant-voltage diode comprises a positive pole and said other pole comprises a negative pole thereof.

3. A device as in claim 2 wherein said electromagnetic coils are normally energized with a positive polarity voltage on said first terminals thereof whereby said constant-voltage diode is forced into reverse conduction whenever more than one of said first terminals is supplied with a positive DC voltage of the normal magnitude.

4. In an automatic speed change control system of an automobile comprising a power source and a plurality of electromagnetic valves with respectively corresponding electromagnetic coils individually connectable thereto through a power control circuit capable of preventing coil energization when triggered by a control signal input at a control terminal thereof, a device for preventing the simultaneous energization of more than one of the electromagnetic coils, said device comprising:

a plurality of resistors, each resistor being connected at one end thereof to an energizable terminal of a respectively corresponding one of said electromagnetic coils, and a constant-voltage diode having one pole thereof connected to said control terminal of the power control circuit and having the other pole thereof connected in common to all the other ends of said plurality of resistors whereby the voltages individually supplied to said electromagnetic coils are effectively summed to cause conduction of said diode and hence triggering of said power control circuit whenever more than one of said electromagnetic coils in energized simultaneously.

* * * * *